W. E. Doolittle,
Door Knob.
No. 92,801.   Patented July 20. 1869.
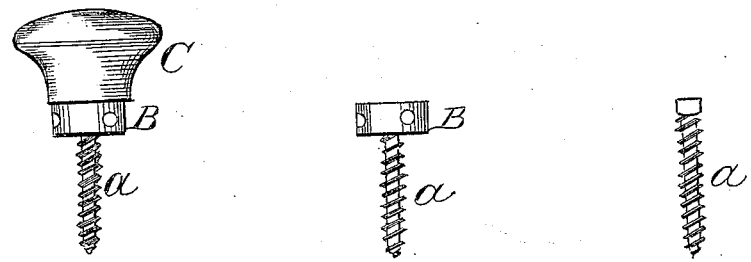
Witnesses
K. H. Richards
J. B. Fairchild
Inventor
W Edson Doolittle

United States Patent Office.

W. EDSON DOOLITTLE, OF WEST HAVEN, CONNECTICUT.

Letters Patent No. 92,801, dated July 20, 1869.

IMPROVEMENT IN MODE OF ATTACHING SCREWS TO KNOBS.

The Schedule referred to in these Letters Patent and making part of the same.

*To all whom it may concern:*

Be it known that I, W. EDSON DOOLITTLE, of the village of West Haven, in the town of Orange, in the county of New Haven, in the State of Connecticut, have invented a new and improved Mode of Attaching Metallic Screws to Knobs made of glass or other plastic material; and I do hereby declare that the following is a full and exact description thereof, reference being had to the accompanying drawings, and to the letters of reference marked thereon.

The nature of my invention consists in permanently affixing a metallic screw, A, to a metallic shell, B, by soldering, brazing, or otherwise, which metallic shell is to be made with holes or corrugations, or both, in the sides or bottom, or both, into which metallic shell B, the glass or other plastic material C is to be pressed, while in a plastic state, filling the holes and flowing around the corrugations, and there hardening, and permanently affixing itself.

To enable others skilled in the art to make and use my invention, I will proceed to describe its construction and operation.

I construct my knobs in any of the known forms, and of glass or other plastic material; and while the glass or other plastic material is in a plastic state, it is pressed into the metallic shell B, which has holes or corrugations, or both, in the sides or bottom, or both, the glass or other plastic material filling the holes and flowing around the corrugations, thus preventing the knob from being separated from the metallic shell B, after the glass or other plastic material C has hardened; and to the metallic shell B, I affix the metallic screw A, either before or after the glass or other plastic material is pressed in. In general, I affix the metallic screw A to the metallic shell B, previous to pressing in the glass or other plastic material C, by soldering, brazing, or otherwise. I generally use, also, a metallic screw, A, the head of which is flattened. The solder, flowing around the flattened sides, assists to prevent the metallic screw A from turning around in the metallic shell B when the knob is being screwed in place.

What I claim as my invention, and desire to secure by Letters Patent, is—

The knob, when secured to the screw and shell or cap B, by means of corrugations or holes, and the material forced into the cap when in a limpid or plastic state, as shown and described.

W. EDSON DOOLITTLE.

Witnesses:
H. H. RICHARDS,
T. B. FAIRCHILD.